United States Patent
Reynolds, Jr. et al.

(10) Patent No.: US 7,478,842 B2
(45) Date of Patent: Jan. 20, 2009

(54) COUPLED CONNECTION WITH AN EXTERNALLY SUPPORTED PIN NOSE SEAL

(75) Inventors: Harris A. Reynolds, Jr., Houston, TX (US); Robert S. Sivley, IV, Kingwood, TX (US)

(73) Assignee: Hydril LLC, Houston, TX (US)

( * ) Notice: Subject to any disclaimer, the term of this patent is extended or adjusted under 35 U.S.C. 154(b) by 117 days.

(21) Appl. No.: 11/131,845

(22) Filed: May 18, 2005

(65) Prior Publication Data
US 2006/0273586 A1    Dec. 7, 2006

(51) Int. Cl.
*F16L 25/00* (2006.01)

(52) U.S. Cl. .................. 285/333; 285/334; 285/355; 285/390

(58) Field of Classification Search ......... 285/333–334, 285/355, 390, 328
See application file for complete search history.

(56) References Cited

U.S. PATENT DOCUMENTS

| | | | |
|---|---|---|---|
| 4,009,893 A | 3/1977 | Schatton et al. | |
| 4,521,042 A | 6/1985 | Blackburn et al. | |
| 4,538,840 A | 9/1985 | DeLange | |
| 4,548,273 A * | 10/1985 | Leicht et al. | 166/348 |
| 4,570,982 A | 2/1986 | Blose et al. | |
| 4,611,838 A | 9/1986 | Heilmann et al. | |
| 4,619,472 A | 10/1986 | Kozono et al. | |
| 4,629,221 A | 12/1986 | Lumsden et al. | |
| 4,762,344 A | 8/1988 | Perkins et al. | |
| 5,348,350 A | 9/1994 | Blose et al. | |
| 5,462,315 A | 10/1995 | Klementich | |
| 5,765,836 A | 6/1998 | Banker et al. | |
| 5,794,985 A | 8/1998 | Mallis | |
| 6,070,912 A | 6/2000 | Latham | |
| 6,666,274 B2 | 12/2003 | Hughes | |
| 6,817,633 B2 | 11/2004 | Brill et al. | |

* cited by examiner

*Primary Examiner*—Aaron Dunwoody
*Assistant Examiner*—Fannie Kee
(74) *Attorney, Agent, or Firm*—Osha • Liang LLP

(57) ABSTRACT

A threaded connection includes a first tubular, a second tubular, and a coupling. The first and second tubulars include external threads, a pin nose, a pin nose surface, a pin shoulder surface, and a pin seal surface located between the pin nose and pin shoulder surfaces. The coupling includes two internal threads corresponding to the external threads of the first and second tubulars and an inner seal support. Upon selected make-up, the pin noses overlap and contact occurs between the pin nose seal surfaces and the inner seal support is in an overlapping axial position with respect to the pin noses such that a diametrical gap exists therebetween.

13 Claims, 6 Drawing Sheets

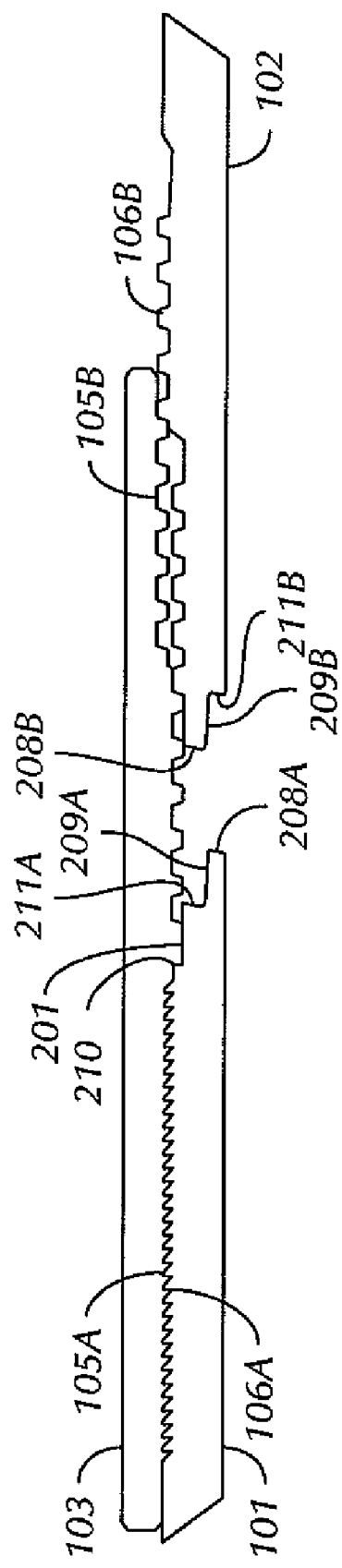
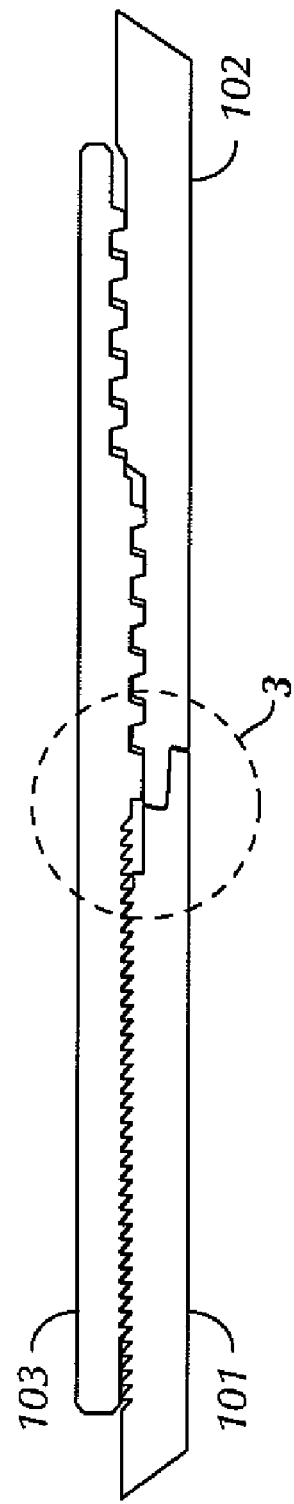
FIG. 2A
FIG. 2B

COUPLED CONNECTION WITH AN EXTERNALLY SUPPORTED PIN NOSE SEAL

BACKGROUND OF INVENTION

Casing joints, liners, tubing, and other oilfield tubulars are often used in drilling, completing, and producing a well. Casing joints, for example, may be emplaced in a wellbore to stabilize a formation, to protect a formation against elevated wellbore pressures (e.g., wellbore pressures that exceed a formation pressure), and the like. Casing joints may be coupled in an end-to-end manner by threaded connections, welded connections, and other connections known in the art. The connections may be designed so as to form a seal between an interior of the coupled casing joints and an annular space formed between exterior walls of the casing joints and walls of the wellbore. The seal may be, for example, an elastomeric seal (e.g., an o-ring seal), a metal-to-metal seal formed proximate the connection, or similar seals known in the art.

Metal-to-metal seals for threaded connections have been designed in many forms. One example of a metal-to-metal seal is disclosed in U.S. Pat. No. 5,462,315 issued to Klementich. That patent is incorporated herein by reference in its entirety. A connection disclosed by Klementich is shown in FIG. 4. The connection includes a two-step external thread 403A and 403B formed on a tubular section 101. Tubular section 102 has a two-step internal thread 402A and 402B that corresponds to the two-step external thread 403A and 403B. Klementich discloses forming corresponding center shoulder seal structures 405 and 406 between the steps on the two-step external thread 403A and 403B and the two-step internal thread 402A and 402B, respectively. At a selected make-up, the corresponding center shoulder seal structures 405 and 406 form a metal-to-metal center shoulder seal, which also acts as a positive-stop torque shoulder. As used herein, "make-up" refers to threading a pin member (external thread) and a box member (internal thread) together. "Selected make-up" refers to threading the pin member and the box member together with a desired amount of torque, or based on a relative position (axial or circumferential) of the pin member with the box member. "Back-off" or "backing-off" refers to the unthreading of corresponding pin members and box members.

One type of connection used for casing joints and tubing is the coupled connection. A prior art coupled connection is shown in FIG. 1. In FIG. 1, a coupled connection includes a coupling 103 with two sets of internal threads 105A and 105B, which correspond to external threads 106A and 106B on tubular sections 101 and 102, respectively. Tubular sections 101 and 102 have the external thread 106A at one end and the external thread 106B at the other end. In some instances, external threads 106A and 106B may have different properties (e.g. thread pitch and thread form). In the coupled connection shown in FIG. 1, the pin nose surfaces 108A and 108B are designed to come into contact at a central plane 110 in the coupling 103. A metal-to-metal seal may be formed by the contact between the pin nose surfaces 108A and 108B.

U.S. Pat. Nos. 4,762,344 and 6,817,633 issued to Perkins and Brill, respectively, disclose coupled connections in which pin noses 108A and 108B contact each other. Those patents are incorporated herein by reference in their entireties. Brill discloses that having contact between pin nose surfaces 108A and 108B serves as a torque shoulder for making-up the coupled connection. Perkins discloses having contact between the pin nose surfaces 108A and 108B such that a seal may by formed when the connection is selectively made-up. For a typical coupled connection, the tubular sections 101 and 102 have two pin members each, while the coupling 103 has two box members corresponding to the pin members.

In FIGS. 5 and 6, two alternative sealing arrangements for coupled connections that are disclosed by Perkins are shown. In FIG. 5, pin nose surfaces 208A and 208B are formed at corresponding angles that are non-perpendicular (inclined or declined) to the axis (not shown) of the tubular sections 101 and 102. At a selected make-up, the pin nose surfaces 208A and 208B contact each other to form a metal-to-metal seal while functioning as a positive-stop torque shoulder. Also, the coupling 103 includes an inwardly projecting annular ridge 140 that, at the selected make-up, engages the outer diameters of the pin noses at an axial position that overlaps pin nose surfaces 208A and 208B. In FIG. 6, the coupling 103 has external threads 106A and 106B formed thereon and the tubular sections 101 and 102 have internal threads 105A and 105B formed thereon, respectively. The tubular sections 101 and 102 have two pairs of corresponding sealing surfaces on their respective ends. Seal surfaces 601A and 601B are formed at corresponding angles that are non-perpendicular to the axis of the tubular sections 101 and 102, which act both as a metal-to-metal seal and a positive-stop torque shoulder. The corresponding angles of seal surfaces 601A and 601B also radially trap the tubular sections 101 and 102 together during make-up. The other pair of sealing surfaces 602A and 602B is at a relatively shallow angle with respect to the axis of the tubular sections 101 and 102.

Referring again to FIG. 1, a typical method for making-up a coupled connection is to make-up the coupling 103 to the end of the tubular section 102 that will be pointing upward toward the surface while in the wellbore. This leaves a box member (internal thread 105A) facing upward. The pin member (external thread 106A) may then be stabbed into the coupling 103 to be made-up. When the pin noses 108A and 108B are designed to contact each other, the making-up of the second tubular section 101 with the coupling 103 causes rubbing to occur between the pin noses 108A and 108B because the tubular sections 101 and 102 are rotated relative to each other. The rubbing can cause the pin noses 108A and 108B to gall, which can prevent a reliable seal from being formed.

To prevent damage to the seal between the pin noses 108A and 108B, the above-mentioned U.S. Pat. No. 4,762,344 issued to Perkins discloses having external threads 106A and 106B that have the same "hand" when facing opposite of each other. In other words, one of the set of threads is manufactured as a left-handed thread (i.e. rotate left to tighten), while the other set of threads is manufactured as a traditional right-handed thread (i.e. rotate right to tighten). This allows for the coupling to be rotated relative to the tubular sections 101 and 102 to make-up the connection, while the tubular sections 101 and 102 do not rotate relative to each other. To be able to securely make-up the connection, Perkins discloses having different thread pitches on the two sets of threads. For example, internal thread 105B and external thread 106B may have a thread pitch of about 3 threads per inch ("TPI"), while internal thread 105A and external thread 106A may have a thread pitch of about 12 TPI.

To use such a coupled connection, external thread 106B may be first partially made-up to a selected position with the internal thread 105B, which may set by having marks (not shown) on the outer diameters of the tubular section 102 and the coupling 103. The other external thread 106A may then be partially made-up to a selected position with the internal thread 105A. The selected position may be such that the pin noses 108A and 108B are close to contacting each other or lightly contacting each other. To finish making-up the connection, both tubular sections 101 and 102 may be restrained from rotating relative to each other while the coupling 103 is rotated. The different thread pitches cause the pin noses 108A and 108B to be brought together axially without relative rotation between the tubular sections 101 and 102. Torque continues to be applied to the coupling 103 until the selected make-up is achieved, which is typically determined by the amount of torque applied to the coupling.

Besides avoiding galling of the seal surface, there are other circumstances where little or no relative rotation of tubular sections is desirable during make-up. For example, long sections of spoolable tubing may be used in various applications, including down hole operations. Some tubular sections may be over 3,000 feet in length, while the wellbore may be 2 or more miles in measured depth. In making-up those connections, rotation of the already deployed tubular section and the still spooled tubular section requires twisting the tubular sections. A coupled connection that does not require rotation of the tubular sections may be used in that circumstance. Temporary pipelines on and around drilling locations may also be suitable for such a coupled connection.

In general, casing and tubing are exposed to greater internal pressure (burst) than external pressure (collapse). Accordingly, fluid and/or gas leaking from the inside of the tubular to the outside due to internal pressure is more common. What is still needed is a pin nose seal that is externally supported to provide an improved seal against internal pressure.

SUMMARY OF INVENTION

In one aspect, the present invention relates to a coupled threaded connection including a first tubular section that includes a first external thread and a first pin nose. The first pin nose includes a first pin nose surface, a first pin seal surface, and a first pin shoulder surface. The first pin seal surface is disposed between the first pin nose surface and the first pin shoulder surface. The coupled threaded connection also includes a second tubular section including a second external thread and a second pin nose. The second pin nose includes a second pin nose surface, a second pin seal surface, and a second pin shoulder surface. The second pin seal surface corresponds to the first pin seal surface. The coupled threaded connection further includes a coupling including a first internal thread adapted to connect to the first external thread, a second internal thread adapted to connect to the second external thread, and an inner seal support. Upon a selected make-up of the first tubular section and the second tubular section with the coupling, the first pin nose is in an overlapping axial position with the second pin nose such that contact occurs between the first pin nose surface and the second pin shoulder surface and contact occurs between the first pin seal surface and the second pin seal surface. The contact between the first pin nose surface and the second pin shoulder acts as a positive-stop torque shoulder and the contact between the first pin seal surface and the second pin seal surface forms a seal. Upon the selected make-up, the inner seal support is in an overlapping axial position with the first and second pin noses and a selected diametrical gap exists between the inner seal support and the first and second pin noses.

In another aspect, the present invention relates to a method of making up a coupled threaded connection. The method includes making-up a first external thread on a first tubular section with a first internal thread on a coupling. At a selected make-up, a coupling shoulder formed on the first tubular section contacts an inner seal support formed on the coupling. The method also includes stabbing a second external thread on a second tubular section into a second internal thread on the coupling. The second external thread and the second internal thread have a different thread pitch than the first external thread and the first internal thread. The first tubular section and the second tubular section are held such that they do not rotate relative to each other. The coupled threaded connection is selectively made-up by rotating the coupling until a first pin nose on the first tubular section is in an overlapping axial position with a second pin nose on the second tubular section such that contact occurs between a first pin seal surface and a second pin seal surface. The inner seal support is in an overlapping axial position with the first and second pin noses and a selected diametrical gap exists between the inner seal support and the first and second pin noses.

In another aspect, the present invention relates to a coupled threaded connection including a first tubular section that includes a first external thread and a first pin nose. The first pin nose includes a first pin nose surface, a first pin seal surface, and a first pin shoulder surface. The first pin seal surface is frustoconical and disposed between the first pin nose surface and the first pin shoulder surface. The coupled threaded connection also includes a second tubular section including a second external thread and a second pin nose. The second pin nose includes a second pin nose surface, a second pin seal surface, and a second pin shoulder surface. The second pin seal surface is frustoconical and corresponds to the first pin scat surface. The first pin nose is radially outward relative to the second pin nose. The coupled threaded connection further includes a coupling including a first internal thread adapted to connect to the first external thread, a second internal thread adapted to connect to the second external thread, and an inner seal support. Upon a selected make-up of the first tubular section and the second tubular section with the coupling, the first pin nose is in an overlapping axial position with the second pin nose such that contact occurs between the first pin nose surface and the second pin shoulder surface and contact occurs between the first pin seal surface and the second pin seal surface. The contact between the first pin nose surface and the second pin shoulder acts as a positive-stop torque shoulder and the contact between the first pin seal surface and the second pin seal surface forms a seal. Upon the selected make-up, the inner seal support is in an overlapping axial position with the first and second pin noses and a selected diametrical gap exists between the inner seal support and the first and second pin noses. The coupled threaded connection can be made-up with substantially no relative rotation between the first tubular section and the second tubular connection.

In another aspect, the present invention relates to a method of designing a coupled threaded connection that includes interlocking pin noses, and a coupled threaded connection designed thereby. The method includes selecting an outer diameter of the interlocking pin noses at a selected make-up, selecting a diametrical gap between the interlocking pin noses and an inner seal support of a coupling, and selecting an internal diameter of the inner seal support based on the selected diametrical gap and the outer diameter of the interlocking pin noses at the selected make-up.

Other aspects and advantages of the invention will be apparent from the following description and the appended claims.

BRIEF DESCRIPTION OF DRAWINGS

FIG. 2A shows a coupled connection in accordance with an embodiment of the present invention.

FIG. 2B shows the coupled connection shown in FIG. 2A after it has been selectively made-up.

DETAILED DESCRIPTION

Figure 1:
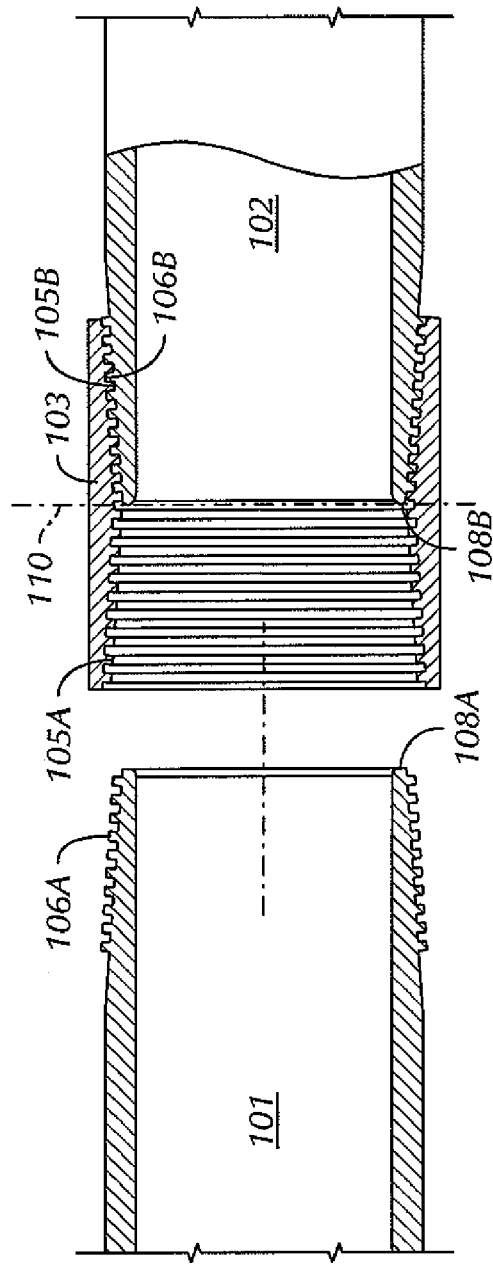
FIG. 1 shows a prior art coupled connection.
Figure 4:
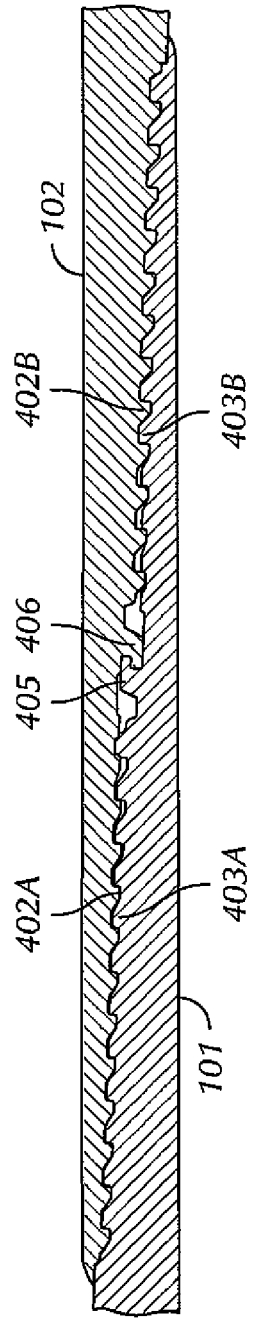
FIG. 4 shows a prior art threaded connection having a metal-to-metal seal.

In one aspect, the present invention provides an externally supported pin nose seal for a coupled connection. In particular, in one embodiment, the pin nose seal is supported by an inner seal support formed in the coupling when exposed to internal pressure.

In FIGS. 2A and 2B, a coupled connection in accordance with an embodiment of the present invention is shown. In FIG. 2A, the external thread 106A on the tubular section 101 has been made-up to a selected position with the internal thread 105A on coupling 103. In this embodiment, the tubular section 101 includes a coupling shoulder 210 that is in contact with an inner seal support 201 on the coupling 103. The coupling shoulder 210 provides a positive indication of the relative axial position of the tubular section 101 in the coupling 103. Also shown in FIG. 2A is the external thread 106B on the tubular section 102 in a stabbed position inside the internal thread 105B on the coupling 103.

In one embodiment, the thread pitch on one end of the coupling 103 may be several times the thread pitch of the other end. For example, the two-step threads (internal thread 105B and external thread 106B) may have a thread pitch of about 3 TPI to about 3.5 TPI, while internal thread 105A and external thread 106A have a thread pitch of about 12 TPI, which is about 4 times the thread pitch of the two-step threads on the other end. In this embodiment, the threads are manufactured with the same hand. Continuing with FIGS. 2A and 2B, the function of having different thread pitches is shown. To make-up tubular section 102 to the coupling 103 without rotating tubular section 101 relative to tubular section 101, both tubular sections 101 and 102 may be held in place relative to each other while rotating the coupling 103. The difference in thread pitch causes the tubular sections 101 and 102 to move axially relative to each other and the coupling 103. For example, 5 turns of the coupling 103 while holding tubular sections 101 and 102 fixed causes the inner seal support 201 to move about 5/12 inch away from the coupling shoulder 210 (loosening the connection on that end) while bringing the tubular section 102 about 1 2/3 inches axially into the coupling (tightening the connection on that end). The net result is that the tubular sections 101 and 102 are brought together axially about 1 1/4 inches while not rotating relative to each other. At the selected make-up, the inner seal support 201 may be in an overlapping axial position with the pin noses. As used herein, the "pin nose" of a tubular section is the non-threaded portion that extends from the external thread to the distal end of the tubular section. Those of ordinary skill in the art will appreciate that the relative axial movement of tubular sections 101 and 102 is determined by the difference in thread pitch. In another embodiment, one end may have a thread pitch of about 2 to about 3 times of the other end. In one embodiment, both ends may have about the same thread pitch. In another embodiment, each end may have a different hand (i.e. one left-handed and the other right-handed) and different thread pitches.

Figure 3:
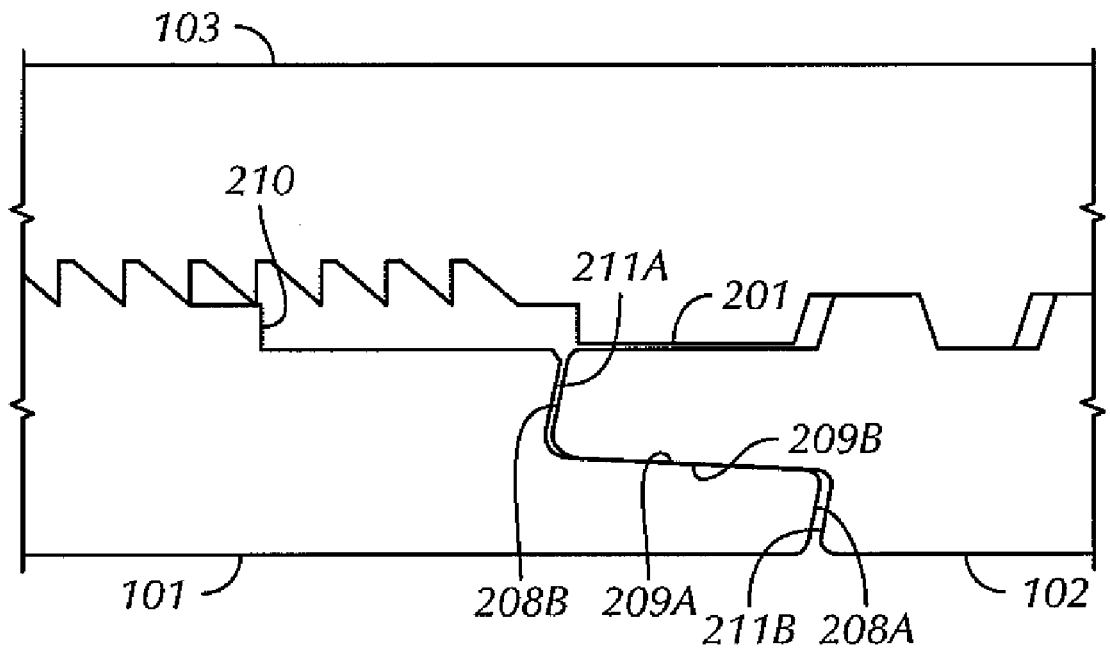
FIG. 3 shows a detailed view of an externally supported pin nose seal in accordance with an embodiment of the present invention.

Turning to FIG. 3, a detailed view of an externally supported thread seal in accordance with an embodiment of the present invention is shown. In this embodiment, tubular section 101 has a pin nose that includes three distinct surfaces that are adjacent to one another; a pin nose surface 208A, a pin seal surface 209A, and a pin shoulder surface 211A. Tubular section 102 has a pin seal surface 209B that is configured to provide a metal-to-metal seal with the pin seal surface 209A when the coupled connection is selectively made-up. Those having ordinary skill in the art will appreciate that metal-to-metal seals between corresponding surfaces may be formed in many ways. For example, in one embodiment, pin seal surfaces 209A and 209B may have corresponding frustoconical surfaces formed at about 1 degree to about 20 degrees with respect to the axial direction. In another embodiment, the angle may be about 5 degrees to about 10 degrees. Those having ordinary skill in the art will appreciate that shallower (i.e. smaller) angles increase the reaction force in the radial direction when the corresponding surfaces are brought into contact. In another embodiment, pin seal surfaces 209A and 209B may have mismatched angles such that a smaller contact area exists between the pin seal surfaces 209A and 209B, which increases the contact pressure. In another embodiment, one of the pin seal surfaces may be frustoconical and the other may be curved. In another embodiment, one of the pin seal surfaces may be frustoconical and the other may be cylindrical. In another embodiment, one of the pin seal surfaces may comprise two frustoconical angles such that an edge exists between the two frustoconical angles.

Tubular section 102 may have a pin nose surface 208B configured to contact the pin shoulder surface 211A when the connection is selectively made-up. As shown in FIG. 3, the pin shoulder surface 211A may be non-perpendicular (inclined or declined) to the axis (not shown) of the tubular sections 101 and 102. In one embodiment, the angle may be about 10 degrees to about 45 degrees. In one embodiment, the angle may be about 15 degrees to about 20 degrees. The pin nose surface 208B may have a corresponding angle such that a "hooking" arrangement exists between the surfaces. As used herein, a hooking arrangement means that the corresponding surfaces are angled such that the pin nose surface 208B is trapped. In FIG. 3, the contact between the pin shoulder surface 211A and the pin nose surface 208B forces the pin nose of the tubular section 102 inward, which in turn increases contact pressure between the pin nose seal surfaces 209A and 209B. Further, contact between the pin shoulder surface 211A and the pin nose surface 208B may act as a positive-stop torque shoulder for the coupled connection. The inner seal support 201 on the coupling 103 provides external support to the sealing arrangement between the pin noses by preventing movement outward in the radial direction. This helps to provide support against internal pressure when the coupled connection is in use. In FIG. 3, there is a selected diametrical gap between the inner seal support 201 the outer diameter of the pin nose when the coupled connection is selectively made-up. When the coupled connection is made-up, the pin noses may be referred to as "interlocking pin noses" because of the overlap and interference between them. Those having ordinary skill in the art will appreciate that the design of the coupled connection to have the selected diametrical gap should take into account the radial deformation of the interlocking pin noses resulting from the contact between the pin noses. The amount of radial deformation will vary based on several factors, including the diameters and lengths of the pin noses and the interference between the respective pin nose surfaces.

For the purpose of describing the present invention in a manner that is independent of the diameter of the tubular section, the selected diametrical gap factor is described herein as the selected diametrical gap divided by the outer diameter of the interlocking pin noses at a selected make-up. Although the selected diametrical gap factor is unitless, it may be referred to as "inches per inch diameter." As used herein, the outer diameter of the interlocking pin noses refers to the outermost generally cylindrical surface of the interlocking pin noses at the axial portion at which the interlocking occurs. For example, in one embodiment, a 3½ inch nominal diameter tubular section may have a selected diametrical gap of about 0.001 inches to about 0.050 inches. In one embodiment, the outer diameter of the outermost pin nose is manufactured to be about 3.25 inches and the selected diametrical gap factor is about 0.002 inches per inch diameter. If the diametrical interference of the pin seal surfaces is about 0.011 inches at a selected make-up and it is assumed that the outer diameter of the interlocking pin noses increases (relative to the manufactured outer diameter of the outermost pin nose) by about half the diametrical interference of the pin seal surfaces, the inner diameter of the inner seal support 201 is manufactured to be about 3.262 inches, achieving a selected diametrical gap of about 0.0065 inches. In such a configuration, an increase in internal pressure may elastically deflect the pin nose seal configuration outward until the outermost surface of the interlocking pin noses contacts the inner diameter of the inner seal support 201. The inner seal support 201 would support the sealing arrangement against further increases in the internal pressure. In one embodiment, the selected diametrical gap may be about 0.010 inches to about 0.015 inches. In another embodiment, the selected diametrical gap may be about 0.001 inches.

Because the diametrical gap at make-up is different from the manufactured diametrical gap, those having ordinary skill in the art will appreciate that the selected diametrical gap may be an estimate based on the geometry of the particular coupled connection (e.g. interference between pin nose seal surfaces) and the selected torque or position at make-up of the coupled connection. In one embodiment, a finite element analysis may be performed on the pin noses to determine the outer diameter of the interlocking pin noses at a selected make-up. Further, for the purpose of selecting the diametrical gap, a finite element analysis may be performed that models internal pressure to determine the radial deformation of the coupled connection to determine at which pressure contact occurs between the inner seal support 201 and the interlocking pin noses.

In the embodiment shown in FIG. 3, a selected gap may exist between the pin nose surface 208A and the pin shoulder surface 211B, which are radially inward from the pin nose surface 208B and the pin shoulder surface 211A. Further, in another embodiment, the pin noses may be designed such that contact occurs between each of the corresponding surfaces. In another embodiment, contact between corresponding surfaces may occur in a sequential manner during the make-up of the coupled connection. For example, in one embodiment, as tubular sections 101 and 102 are brought together axially, contact may occur first between the pin seal surfaces 209A and 209B, which pushes the pin nose of tubular section 102 radially outward. Continued axial movement due to making-up the coupled connection may then cause contact between the pin nose surface 208B and the pin shoulder surface 211A, which pushes the pin nose of tubular section 102 inward, causing increased contact pressure between pin seal surfaces 209A and 209B. In one embodiment, increasing make-up torque may bring the pin nose surface 208A and the pin nose shoulder 211B into contact at a selected make-up. In another embodiment, a selected gap may exist between those two surfaces at a selected make-up such that the two surfaces contact under a determined compressive load, which increases the compressive strength of the coupled threaded connection. Those having ordinary skill in the art will appreciate that the gap may be selected depending on the torque range for which the coupled connection is designed.

Figure 7:
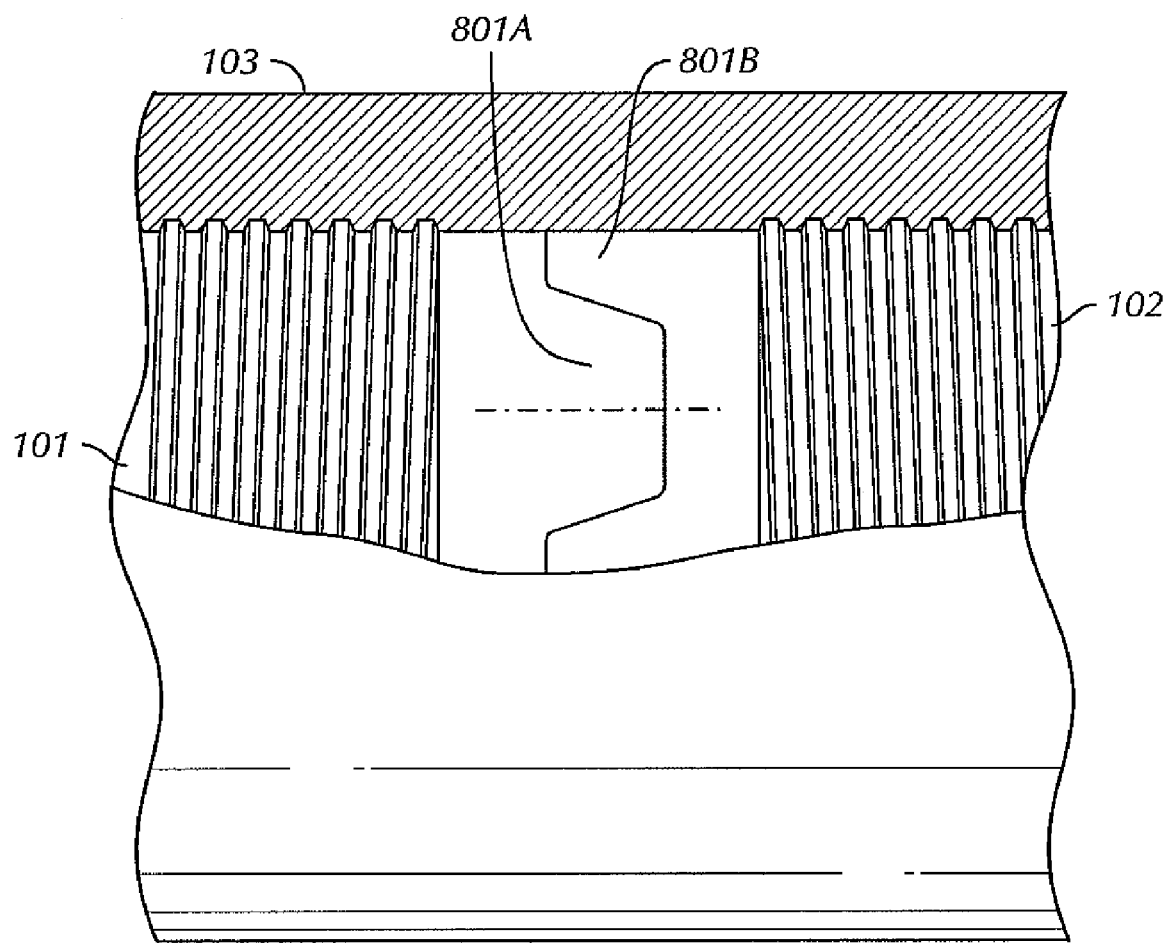
FIG. 7 shows a prior art coupled connection having corresponding castellations on the pin noses.

In coupled connections in accordance with some embodiments of the present invention, increased resistance to torque and unintended backing-off of the connection may be desirable to maintain sealing and the structural integrity of the connection as a whole depending on the intended use. In some embodiments, the pin noses of corresponding pin members may include corresponding "lugs" or "castellations" that overlap axially and prevent relative rotation of the pin members when the connection is made-up. In FIG. 7, a prior art coupled connection disclosed in U.S. Pat. No. 5,794,985 issued to Mallis is shown. That patent is assigned to the assignee of the present invention and incorporated herein by reference in its entirety. As shown in FIG. 7, the coupled connection disclosed by Mallis includes pin members 101 and 102 having pin noses 108A and 108B with castellations 801A and 801B. The castellations 801A and 801B may be milled or otherwise formed on the pin noses 108A and 108B. When the coupled connection is made-up, the castellations 801A and 801B overlap axially, which prevents pin members 101 and 102 from rotating relative to each other. After make-up, the only way to back-off the coupled connection is to turn the coupling because pin members will be unable to turn relative to each other. Thus, neither right nor left-handed torque applied to the tubular sections will back-off the connection unless the coupling rotates relative to both pin members, while both pin members are held fixed relative to each other.

Figure 8A:
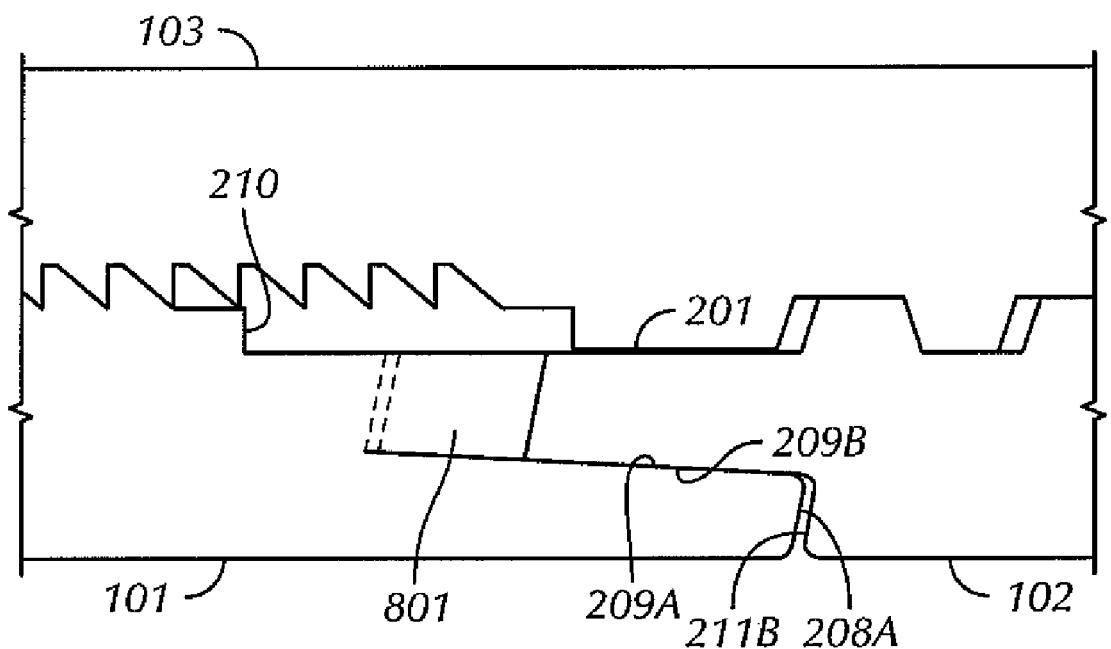
FIGS. 8A, 8B, and 8C show detailed views of externally supported pin nose seals in accordance with embodiments of the present invention.
Figure 5:
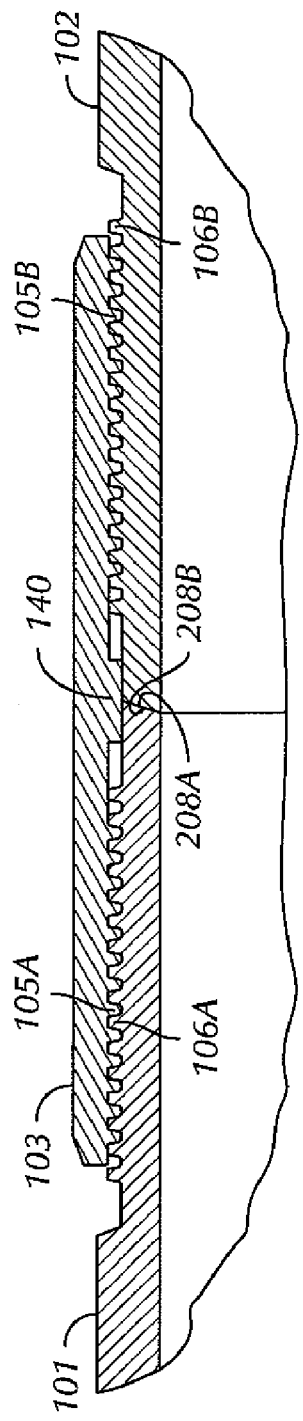
FIG. 5 shows a prior art coupled connection having a metal-to-metal seal.
Figure 6:
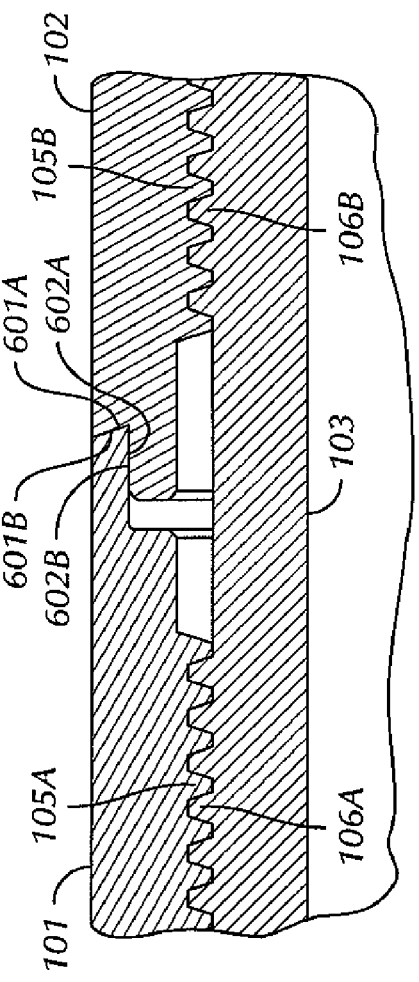
FIG. 6 shows a prior art coupled connection having a metal-to-metal seal.
Figure 8B:
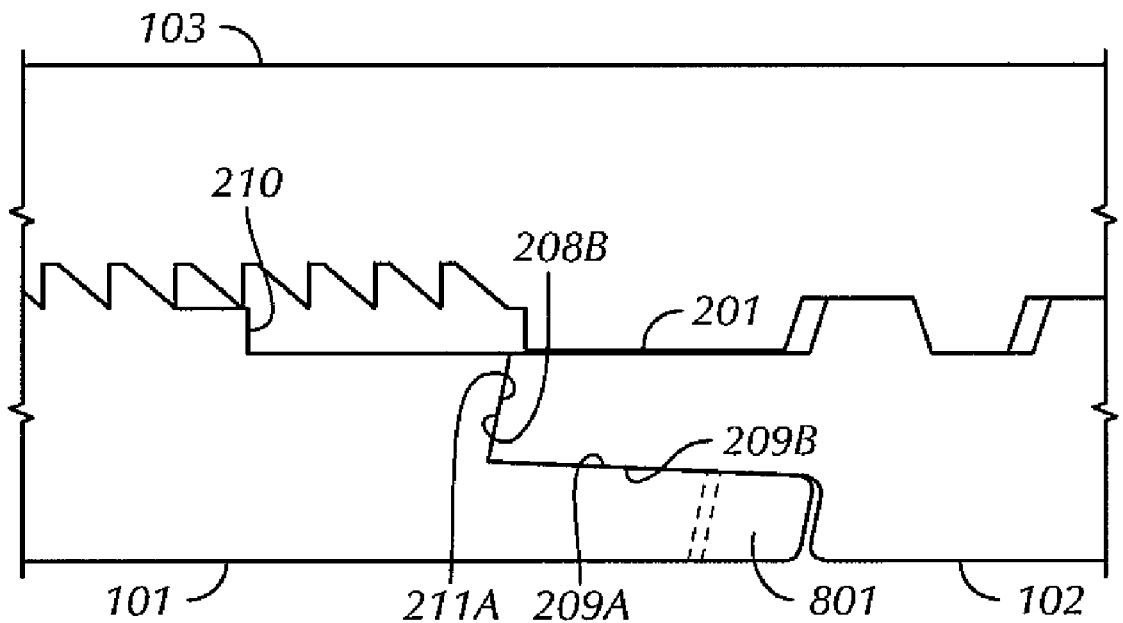
Figure 8C:
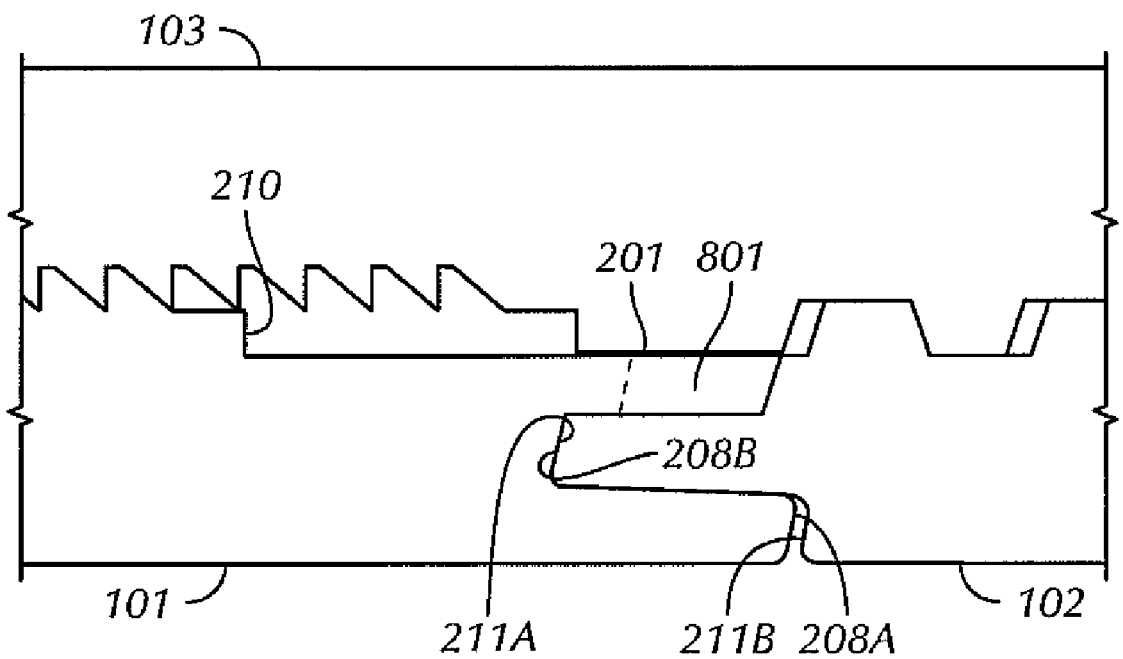

Turning to FIGS. 8A-C, externally supported pin nose seals in accordance with embodiments of the present invention are shown. In FIGS. 8A-C, the inner seal support 201 is shown to be in contact with the pin noses, which would occur when a sufficient internal pressure exists to outwardly deflect the pin noses. In FIG. 8A, the embodiment includes castellations 801 formed on the pin noses 108A and 108B of both pin members 101 and 102. In comparing the embodiment shown in FIG. 8A to FIG. 3, pin nose surface 208B and pin nose shoulder 211A shown in FIG. 3 have the castellations 801 formed thereon (i.e. pin nose surface 208B and pin nose shoulder 211A are "castellated"). Note that castellating the pin nose surface 208B and the pin nose shoulder 211A will make sealing between those two surfaces difficult, however, they may still serve as a positive-stop torque shoulder radially outward from the pin seal surfaces 209A and 209B. In one embodiment, the ends of the castellations (i.e. pin nose surface 208B and pin nose shoulder 211A) may have corresponding angles, such as about 15 degrees, to provide a hooking arrangement. The castellations 801 may be formed in any shape or pattern such that axial overlap of the castellations 801 can occur in an interlocking manner to resist relative rotation when the coupled connection is made-up. For example, the castellations 801 may be sinusoidal curves, rectangular, V-shaped, or any other corresponding pattern. Further, only one castellation 801 and a corresponding slot are required to axially overlap and provide resistance to relative rotation (i.e. torque resistance) between the pin members 101 and 102. For example, the castellation 801 may be a semicircle. To make-up a coupled connection having corresponding castellations 801 formed thereon, the same methods described above for making-up a coupled connection with little or no relative rotation of the tubular sections may be used after aligning the tubular sections such that the corresponding castellations 801 are in a complimentary position to allow axial overlap.

Those having ordinary skill in the art will appreciate that several design factors determine the torque resistance provided by the castellations, including the cross sectional area (as measured transverse to the axis) at the base of the castellations, which is exposed to shear force when torque of the pin members occurs. The maximum cross sectional area, assuming zero clearance between castellations, is about one-half of the total cylindrical area as calculated using the internal and outer diameter of the castellations. In the design of a coupled connection, the cross sectional area is usually the most constrained design factor due to the desire for a maximum flow area through the inside of the tubular sections while also being constrained by the size of the wellbore in which the tubular sections may be deployed. Another design factor is the total contact area ("bearing area") between the corresponding castellations. The contact stress resulting from the transfer of torque between the pin members will be substantially proportional to the bearing area. A greater number of castellations, an increased radial thickness, or increased axial length will increase the bearing area. Note that increasing the axial length of the castellations may result in an undesirable loss of stiffness for the pin noses, which can result in an unreliable metal-to-metal seal between the pin seal surfaces and cause the pin noses to have an increased vulnerability to damage during handling. Those having ordinary skill in the art will be able to determine the desirable bearing area based on the expected torque and the material to be used for the tubular sections. Further, castellations in accordance with embodiments of the present invention do not need to have the ability to independently resist torque up to the maximum torque of the coupled connection, and instead, may act as a supplement to the torque strength provided by the threaded connection itself.

In FIG. 8B, the embodiment includes castellations 801 formed on the pin noses 108A and 108B of both pin members 101 and 102. In comparing the embodiment shown in FIG. 8B to FIG. 3, pin nose surface 208A and pin nose shoulder 211B shown in FIG. 3 have the castellations 801 formed thereon. In this embodiment, the castellations 801 are radially inward from the pin seal surfaces 209A and 209B, and pin nose surface 208B and pin shoulder surface 211A serve as a positive stop torque shoulder radially outward from the pin seal surfaces 209A and 209B. In one embodiment, pin nose surface 208B and pin shoulder surface 211A serve as a secondary metal-to-metal seal in addition to being a positive stop torque shoulder. Note that, by moving castellations 801 radially inward (as compared to FIG. 8A), the cross sectional area and bearing area of the castellations 801 would be reduced, assuming the same radial thickness, axial length, and quantity for the castellations 801 and the same inner and outer diameter for the coupled connection. Those having ordinary skill in the art will be able to make adjustments to the castellations 801 and the pin noses 108A and 108B to compensate for any reduced bearing area and cross sectional area. For example, the radial thickness of pin nose surface 208B and pin shoulder surface 211A may be reduced while increasing the radial thickness of pin nose surface 208A and pin shoulder surface 211B (and the castellations 801 formed thereon).

One example of a suitable application for increased torque resistance is in offshore applications in which coupled connections join tubular sections being used as risers. The risers are exposed to the ocean currents. As the seawater flows around the risers, vortex-induced vibrations ("VIV") may result. This phenomenon is a regular concern in offshore production environments because VIV can lead to premature failure from fatigue. Many steps have been taken by the energy industry to reduce the severity of VIV and to mitigate the detrimental effects on various submerged components. Even if VIV is reduced, it may still cause connections in the risers to back-off, which would prevent the connection from sealing and possibly separate the tubular sections from one another entirely. Having axially overlapping castellations on the pin noses of the tubular sections will prevent the coupled connection from loosening because backing-off the coupled connection will require rotation of the coupling relative to both tubular sections.

Embodiments of the present invention may provide one or more of the following advantages. For coupled connections for which it is desirable to not have tubular sections contact each other while rotating, embodiments having a coupled connection that requires little or no relative rotation between the tubular sections during make-up may be used. This configuration may be desirable to avoid galling between corresponding surfaces on the pin noses. Further, the configuration may be particularly useful when a specific rotational alignment is required between tubular sections. This situation may exist, for example, when electrical contacts in the pin noses of tubular sections are to be aligned. One example of an application for a coupled connection is for U.S. Pat. No. 6,666,274 issued to Hughes. That patent is incorporated herein by reference in its entirety. Hughes discloses tubular sections having wires embedded therein for the purpose of transmitting power and data signals. To transmit the power and data signals between tubular sections, ends of the wires of each tubular section has have to be aligned to connect with corresponding wires in neighboring tubular connections. The use of a coupled connection that requires little or no relative rotation between the tubular sections aids in the alignment of the ends of the wires. An embodiment of the present invention may at the same time provide a reliable pin nose seal between neighboring tubular sections.

Embodiments of the present invention having an inner seal support formed on the coupling provide increased sealing ability for the coupled connection. In coupled connections, particularly for smaller sizes of tubing, the thickness of the pin noses allows for relatively easy deformation, which can cause a metal-to-metal seal formed between the pin noses to fail. An inner seal support formed within the coupling provides an effective increase in the wall thickness of the pin noses, while not increasing the outer diameter of the coupling or decreasing the inner diameter of the tubular sections. As a result, radially outward deformation of the pin noses experiencing internal pressure and the subsequent failure of the metal-to-metal seal may be avoided.

The metal-to-metal seal disclosed above may be designed to provide sealing ability equal to or greater than the burst pressure of the tubular section on which it is used. In prior art metal-to-metal seals, it is generally considered beneficial for at least some rotation to occur as the metal-to-metal sealing surfaces are brought into contact. This provides a slight polish or burnish to the sealing surfaces to provide a better seal, however, too much burnishing can cause the sealing surfaces to gall, which weakens the seal. The present invention provides a reinforced sealing arrangement that can provide a reliable and strong metal-to-metal seal without having to burnish the sealing surfaces. Accordingly, the risk of galling of the sealing surfaces may be eliminated.

The present inventors have found that a coupled connection manufactured in accordance with one embodiment of the present invention can provide a very effective metal-to-metal seal between pin noses. Pressure tests and tensile tests have been performed on a coupled connection similar to the embodiment shown in FIG. 3. The metal-to-metal seal was able to hold internal pressure up to the burst pressure of the tubular sections. A common problem encountered with prior art pin nose seals is that tension between the tubular sections can reduce the sealing ability. The present inventors were surprised to find that the sealing integrity of the pin nose seal was maintained under tension.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A coupled threaded connection comprising:
   a first tubular section comprising a first external thread and a first pin nose, the first pin nose comprising a first pin nose surface, a first pin seal surface, and a first pin shoulder surface, wherein the first pin seal surface is disposed between the first pin nose surface and the first pin shoulder surface;
   a second tubular section comprising a second external thread and a second pin nose, the second pin nose comprising a second pin nose surface, a second pin seal surface, and a second pin shoulder surface, wherein the second pin seal surface corresponds to the first pin seal surface; and
   a coupling comprising a first internal thread adapted to connect to the first external thread, a second internal thread adapted to connect to the second external thread, and an inner seal support,
   wherein upon a selected make-up of the first tubular section and the second tubular section with the coupling, the first pin nose is in an overlapping axial position with the second pin nose such that contact occurs between the first pin nose surface and the second pin shoulder surface and contact occurs between the first pin seal surface and the second pin seal surface, contact between the first pin nose surface and the second pin shoulder surface acting as a positive-stop torque shoulder and contact between the first pin seal surface and the second pin seal surface forming a seal therebetween,
   wherein upon the selected make-up, the inner seal support is in an overlapping axial position with the first pin nose and the second pin nose and a selected diametrical gap exists between the inner seal support and the first pin nose and the second pin nose,
   wherein the first pin nose surface and the second pin shoulder surface are in a hooking arrangement, and
   wherein upon the selected make-up, contact occurs between the second pin nose surface and the first pin shoulder surface.

2. The coupled threaded connection of claim 1, wherein the first pin nose surface is radially outward relative to the second pin nose surface.

3. The coupled threaded connection of claim 1, wherein the second pin nose surface is radially outward relative to the first pin nose surface.

4. The coupled threaded connection of claim 1, wherein the hooking arrangement is formed by corresponding angles of the first pin nose surface and the second pin shoulder surface, the corresponding angles being between about 10 degrees and about 20 degrees.

5. The coupled threaded connection of claim 1, wherein at least one of the first pin seal surface and the second pin seal surface is frustoconical.

6. The coupled threaded connection of claim 1, wherein the coupled threaded connection can be made-up with substantially no relative rotation between the first tabular section and the second tubular connection.

7. The coupled threaded connection of claim 6, wherein one of the first tubular section and the second tubular section comprises a coupling shoulder.

8. The coupled threaded connection of claim 1, wherein the contact between the first pin nose surface and the second pin shoulder surface forms a seal therebetween.

9. The coupled threaded connection of claim 1, wherein one of the first pin nose surface and the second pin nose surface is castellated, a corresponding one of the second pin nose shoulder and the first pin nose shoulder being correspondingly castellated.

10. The coupled threaded connection of claim 1, wherein the selected diametrical gap is about 0.001 inches to about 0.050 inches.

11. The coupled threaded connection of claim 10, wherein the selected diametrical gap is about 0.002 inches to about 0.015 inches.

12. A coupled threaded connection comprising:
   a first tubular section comprising a first external thread and a first pin nose, the first pin nose comprising a first pin nose surface, a first pin seal surface, and a first pin shoulder surface, wherein the first pin seal surface is frustoconical and disposed between the first pin nose surface and the first pin shoulder surface;
   a second tubular section comprising a second external thread and a second pin nose, the second pin nose comprising a second pin nose surface, a second pin seal surface, and a second pin shoulder surface, wherein the second pin seal surface is frustoconical and corresponds to the first pin seal surface; and
   a coupling comprising a first internal thread adapted to connect to the first external thread, a second internal thread adapted to connect to the second external thread, and an inner seal support,
   wherein the first pin nose surface is radially outward relative to the second pin nose surface,
   wherein upon a selected make-up of the first tubular section and the second tubular section with the coupling, the first pin nose is in an overlapping axial position with the second pin nose such that contact occurs between the first pin nose surface and the second pin shoulder surface and contact occurs between the first pin seal surface and the second pin seal surface, contact between the first pin nose surface and the second pin shoulder surface acting as a positive-stop torque shoulder and contact between the first pin seal surface and the second pin seal surface forming a seal therebetween, wherein upon the selected make-up, the inner seal support is in an overlapping axial position with the first pin nose and the second pin nose and a selected diametrical gap exists between the inner seal support and the first pin nose and the second pin nose, wherein the coupled threaded connection can be made-up with substantially no relative rotation between the first tubular section and the second tubular connection, wherein upon the selected make-up, contact occurs between the second pin nose surface and the first pin shoulder surface, wherein one of the first pin nose surface and the second pin nose surface is castellated, a corresponding one of the second pin nose shoulder and the first pin nose shoulder being correspondingly castellated.

13. A coupled threaded connection comprising:

a first tubular section comprising a first external thread and a first pin nose;

the first pin nose comprising a first pin nose surface, a first pin seal surface, and a first pin shoulder surface; wherein the first pin seal surface is disposed between the first pin nose surface and the first pin shoulder surface;

a second tubular section comprising a second external thread and a second pin nose;

the second pin nose comprising a second pin nose surface, a second pin seal surface, and a second pin shoulder surface, wherein the second pin seal surface corresponds to the first pin seal surface;

a coupling comprising a first internal thread adapted to connect to the first external thread, a second internal thread adapted to connect to the second external thread, and an inner seal support, wherein the inner seal support is located at a diameter smaller than a crest diameter of at least one of the first internal thread and the second internal thread;

wherein upon a selected make-up of the coupling, the first pin nose is in an overlapping axial position with the second pin nose such that contact occurs between the first pin nose surface and the second pin shoulder surface and contact occurs between the first pin seal surface and the second pin seal surface, contact between the first pin nose surface and the second pin shoulder surface acting as a positive-stop torque shoulder and contact between the first pin seal surface and the second pin seal surface forming a seal therebetween, and where in upon the selected make-up, contact occurs between the second pin nose surface and the first pin shoulder surface.

\* \* \* \* \*